US011625579B2

(12) United States Patent
Nishi et al.

(10) Patent No.: US 11,625,579 B2
(45) Date of Patent: Apr. 11, 2023

(54) SPIKING NEURAL NET WORK DEVICE AND LEARNING METHOD OF SPIKING NEURAL NETWORK DEVICE

(71) Applicant: KABUSHIKI KAISHA TOSHIBA, Minato-ku (JP)

(72) Inventors: Yoshifumi Nishi, Yokohama (JP); Kumiko Nomura, Shinagawa (JP); Radu Berdan, Shinagawa (JP); Takao Marukame, Chuo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 436 days.

(21) Appl. No.: 16/803,641

(22) Filed: Feb. 27, 2020

(65) Prior Publication Data

US 2021/0056383 A1 Feb. 25, 2021

(30) Foreign Application Priority Data

Aug. 19, 2019 (JP) .............................. JP2019-149790

(51) Int. Cl.
*G06N 3/04* (2006.01)
*G06N 3/049* (2023.01)
(Continued)

(52) U.S. Cl.
CPC ........... *G06N 3/049* (2013.01); *G06N 3/0472* (2013.01); *G06N 3/063* (2013.01); *G06N 3/08* (2013.01)

(58) Field of Classification Search
CPC ...... G06N 3/0472; G06N 3/049; G06N 3/063; G06N 3/08; G06N 3/088
See application file for complete search history.

(56) References Cited

U.S. PATENT DOCUMENTS

2012/0011093 A1 1/2012 Aparin et al.
2018/0075346 A1 3/2018 Pantazi et al.
(Continued)

FOREIGN PATENT DOCUMENTS

JP 2013-534018 A 8/2013

OTHER PUBLICATIONS

Van Rossum et al., "Stable Hebbian Learning from Spike Timing-Dependent Plasticity", Dec. 1, 2000, The Journal of Neuroscience, 20(23), pp. 8812-8821. (Year: 2000).*
(Continued)

*Primary Examiner* — Brent Johnston Hoover
(74) *Attorney, Agent, or Firm* — Oblon, McClelland, Maier & Neustadt, L.L.P.

(57) ABSTRACT

A spiking neural network device according to an embodiment includes a synaptic element, a neuron circuit, a synaptic potentiator, and a synaptic depressor. The synaptic element has a variable weight. The neuron circuit inputs a spike voltage having a magnitude adjusted in accordance with the weight of the synaptic element via the synaptic element, and fires when a predetermined condition is satisfied. The synaptic potentiator performs a potentiating operation for potentiating the weight of the synaptic element depending on input timing of the spike voltage and firing timing of the neuron circuit. The synaptic depressor performs a depression operation for depressing the weight of the synaptic element in accordance with a schedule independent from the input timing of the spike voltage and the firing timing of the neuron circuit.

9 Claims, 14 Drawing Sheets

(51) Int. Cl.
  *G06N 3/08* (2023.01)
  *G06N 3/063* (2023.01)

(56) References Cited

U.S. PATENT DOCUMENTS

2019/0138900 A1* 5/2019 Linares-Barranco .... G06N 3/08
2019/0213472 A1* 7/2019 Park ..................... G06N 3/049

OTHER PUBLICATIONS

Severin Sidler, et al., "Unsupervised Learning Using Phase-Change Synapses and Complementary Patterns", International Symposium on Artificial Neural Networks, 2017, pp. 281-288.
M. Suri, et al., "CBRAM Devices as Binary Synapses for Low-Power Stochastic Neuromorphic Systems: Auditory (Cochlea) and Visual (Retina) Cognitive Processing Applications", IEEE, 2012, 4 pages.
Priyadarshini Panda et al., "Learning to Generate Sequences with Combination of Hebbian and Non-hebbian Plasticity in Recurrent Spiking Neural Networks", Frontiers in Neuroscience, Dec. 12, 2017, 11 pages.

* cited by examiner

EACH SECTION INCLUDING 28 X 28 PIXELS

INITIAL STATE

EACH SECTION INCLUDING 28 X 28 PIXELS

AFTER LEARNING 60,000 TIMES

RECOGNITION RATE OF ABOUT 10%

FIG.4C

EACH SECTION INCLUDING 28 X 28 PIXELS

SYNAPTIC NORMALIZATION IMPLEMENTED

RECOGNITION RATE OF ABOUT 89%

EACH SECTION INCLUDING 28 X 28 PIXELS

AFTER LEARNING 60,000 DATA PATTERNS

RECOGNITION RATE OF 77.7%

EACH SECTION INCLUDING 28 X 28 PIXELS

AFTER LEARNING 60,000 DATA PATTERNS

RECOGNITION RATE OF 81.1%

LOW RESISTIVE STATE

HIGH RESISTIVE STATE

SPIKING NEURAL NET WORK DEVICE AND LEARNING METHOD OF SPIKING NEURAL NETWORK DEVICE

CROSS-REFERENCE TO RELATED APPLICATIONS

This application is based upon and claims the benefit of priority from Japanese Patent Application No. 2019-149790, filed on Aug. 19, 2019; the entire contents of which are incorporated herein by reference.

FIELD

Embodiments described herein relate generally to a spiking neural network device and a learning method of the same.

BACKGROUND

Artificial intelligence technologies are developing rapidly with the progress in computing hardware such as graphical processing units (GPUs). Examples of the artificial intelligence include convolutional neural networks (CNNs), which are one of the main technologies for image recognition and image classification, and such technologies have found more and more real-life applications. Currently widely available artificial intelligence technologies are based on simplified mathematical models inspired by the operations of biological neural networks, and are suitably implemented by computing devices such as GPUs. However, implementing the artificial intelligence by GPUs is highly energy intensive. In particular, the learning process including extracting features from a large amount of data and storing them requires huge computational operations and thus requires a large amount of electric energy, which will be a constraint on learning at the edge.

Human brains, on the other hand, consume less energy of about 20 W, but can learn a large amount of data constantly online. Scientists and researchers around the world have been studying information processing technologies of reproducing the brain operations relatively faithfully using electric circuits.

In the neural networks of the brains, information is transmitted from neurons to neurons in the form of spike voltage signals. Neurons are interconnected by, what is called, synapses. When a neuron fires and generates a spike voltage, the spike voltage is input to downstream neurons via synapses. The magnitude of the spike voltage input to the downstream neurons is adjusted by the interconnecting strength (hereinafter referred to as "weight") of the synapses. A synapse having a large synaptic weight transmits the spike voltage to a postsynaptic neuron without reducing the magnitude of voltage, whereas a synapse having a small synaptic weight weakens the magnitude of the spike voltage to be transmitted. In this regard, a larger synaptic weight between neurons indicates that these neurons have a strong relation in terms of information transmitted therebetween.

It is known that the synaptic weight varies depending on the input timing of the spike voltage to the postsynaptic neuron and the firing timing of the postsynaptic neuron. When a spike voltage is input from a neuron (presynaptic neuron) to a subsequent neuron (postsynaptic neuron) via an interconnecting synapse, and then the postsynaptic neuron fires, the information of the presynaptic neuron and the information of the postsynaptic neuron have a causal relationship, and the synaptic weight between these two neurons increases. Alternatively, if the postsynaptic neuron fires before receiving the spike voltage from the presynaptic neuron, the information of the presynaptic neuron and the information of the postsynaptic neuron have no causal relationship, and the synaptic weight between these two neurons decreases. This feature involving a change in synaptic weight depending on the input timing of the spike voltage and the firing timing is called spike timing-dependent plasticity (STDP).

An information processing technique mimicking the information processing rules of such neural networks and representing a flow of information in an electric circuit by using spike trains is called a spiking neural network. In the spiking neural network, no numerical calculations are performed but all the information processing procedures are performed by storage, generation, and transmission of spike voltages. Training a conventional artificial intelligence requires a huge number of computational processes. However, the spiking neural network is considered to be able to be trained efficiently by using the STDP rules, and many studies on spiking neural networks have been made.

As described above, the key feature of STDP is that the synaptic weight varies depending on the input timing of a spike voltage from a presynaptic neuron to a postsynaptic neuron via an interconnecting synapse and the firing timing of the postsynaptic neuron. This STDP architecture is based on an input of a spike voltage from the presynaptic neuron. In other words, if input information is extremely small, no spike voltage is input from the presynaptic neuron, and the synaptic weight is not changed. This may cause the following problems.

Suppose that, for example, a spiking neural network learns input image patterns of 10×10 pixels. First, an image pattern (image A) widely spread in a 10×10 pixel grid is input repeatedly. The spiking neural network learns the input data based on the STDP learning rules and updates the synaptic weight accordingly, thereby obtaining a synaptic weight distribution corresponding to the image pattern. Then, another image pattern (image B) concentrating in the center of the 10×10 pixel grid is input. That is, most of the pixels of the image B are blank pixels. In spiking neural networks, information is represented by the density (spike density) of spike voltages, and thus blank pixels are represented as zero spike density. Accordingly, most of the synapses in this neural network receive no spike voltage and their weights are unchanged. In other words, the spiking neural network is not capable of learning this new image B due to the remaining synaptic weight distribution corresponding to the image A, regardless of how many times the neural network learns the image B. In this regard, when an STDP trained network receives information having a low spike density, it fails to learn this information and keeps the previously learned information.

To prevent this problem, a conventional technology discloses a method of preparing two sets of spiking neural networks, one of which is trained by inputting original data and the other one of which is trained by inputting black-white inverted data. This method requires two sets of spiking neural networks, requiring twice the number of neurons and synapses. This configuration may double the size of the hardware, and double the energy required.

In biological neural networks, the sum of the weights of synapses input to one neuron is constant. This phenomenon is called synaptic normalization. In synaptic normalization, there is no change in the relative magnitude between the synaptic weights, and if one synaptic weight increases after learning, the other synaptic weights decrease to keep the sum constant. This configuration reduces the weight of synapses receiving a low spike voltage. Biological nervous systems use this scheme to learn blank data having a low spike density. However, implementing the synaptic normalization in hardware can be difficult because the synaptic normalization scheme requires adding synaptic weights for each neuron and dividing each synaptic weight by the sum.

In the spiking neural networks, as described above, information is represented by spike density and thus information indicating "nothing" is represented as no spike density (no spikes). When a spiking neural network learns based on the STDP rules, the spiking neural network updates the synaptic weights depending on the input timing of spike voltages and the firing timing, and thus fails to learn blank data indicating "nothing", or information having a low spike density.

BRIEF DESCRIPTION OF THE DRAWINGS

FIG. 4C is a diagram illustrating visualized weights of all the synapses illustrated in FIG. 3;

DETAILED DESCRIPTION

According to one embodiment, a spiking neural network device according to an embodiment includes a synaptic element, a neuron circuit, a synaptic potentiator, and a synaptic depressor. The synaptic element has a variable weight. The neuron circuit inputs a spike voltage having a magnitude adjusted in accordance with the weight of the synaptic element via the synaptic element, and fires when a predetermined condition is satisfied. The synaptic potentiator performs a potentiating operation for potentiating the weight of the synaptic element depending on input timing of the spike voltage and firing timing of the neuron circuit. The synaptic depressor performs a depression operation for depressing the weight of the synaptic element in accordance with a schedule independent from the input timing of the spike voltage and the firing timing of the neuron circuit.

The following describes preferred embodiments of a spiking neural network device and its learning method according to the present disclosure with reference to the accompanying drawings.

Explanation on STDP

Figure 1:
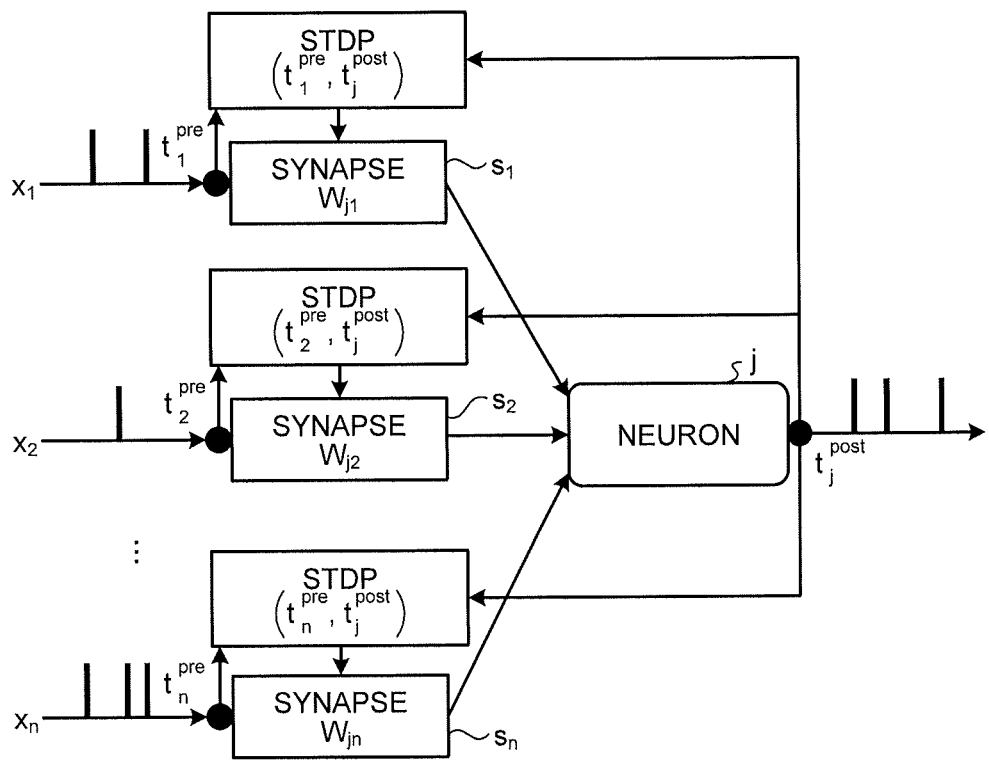
FIG. 1 is a schematic diagram illustrating STDP rules.

First, STDP learning rules for a spiking neural network are described. FIG. 1 is a schematic diagram illustrating the STDP rules. As illustrated in FIG. 1, a plurality of synapses $s_1, s_2, \ldots, s_n$ (which may be hereinafter collectively referred to as synapses $s_i$) are connected to a neuron j. Consider a case in which spike voltages $x_1, x_2, \ldots, x_n$ are input to the neuron j through the synapses $s_1, s_2, \ldots, s_n$, respectively. Let the weights $w_{ji}$ of the synapses $s_1, s_2, \ldots, s_n$ be $w_{j1}, w_{j2}, \ldots, w_{jn}$, respectively.

The state of the neuron j is represented by an internal variable called membrane potential. If no spike voltage is input, the membrane potential varies in accordance with a set rule called a neuron model. An input of a spike voltage to the neuron j increases the membrane potential discontinuously. After several spike voltages are input to the neuron j and the membrane potential reaches a threshold, the neuron j fires and releases a spike voltage to downstream neurons. After firing, the membrane potential of the neuron j is reset to a certain value, which is called a reset potential.

Suppose that a spike voltage is input to the neuron j via the synapse $s_1$ having the weight $w_{j1}$ at time $t_1^{pre}$, and the neuron j fires at time $t_j^{post}$, where $\Delta t_{ji} = t_j^{post} - t_1^{pre}$. If $\Delta t_{ji} > 0$, that is, if the neuron j fires after receiving the spike voltage through the synapse $s_1$, the input of the spike voltage and the firing of the neuron j have a causal relation. Thus, connection of the synapse $s_1$ is considered to be effective in processing information and the weight $w_{j1}$ of the synapse $s_1$ is potentiated (increased). Conversely, if $\Delta t_{ji} < 0$, that is, if the neuron j fires before the spike voltage reaches the neuron j via the synapse $s_1$, the input of the spike voltage and the firing of the neuron j have no causal relation. Thus, connection of the synapse $s_1$ is considered to be not effective in processing information and the weight $w_{j1}$ of the synapse $s_1$ is depressed (decreased).

Figure 2:
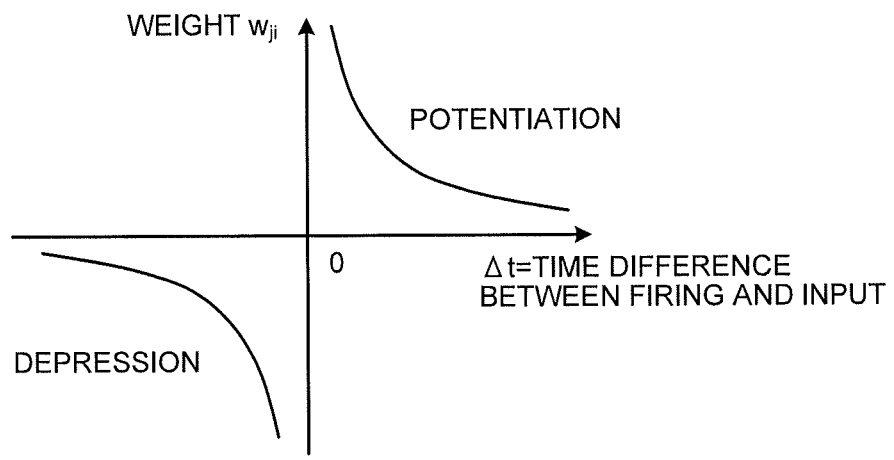
FIG. 2 is a graph illustrating an example of potentiation and depression of synaptic weight.

In the STDP trained network, the extent to which the weight $w_{ji}$ of the synapse $s_i$ is potentiated or depressed is determined in accordance with the time difference $\Delta t$ between the time at which the neuron j fires and the time at which the spike voltage is input via the synapse $s_i$. In other words, as illustrated in FIG. 2, if $\Delta t > 0$, a time difference $\Delta t$ having a smaller absolute value means a greater informational correlation between the firing of the neuron j and the input of a spike voltage, and thus, the weight $w_{ji}$ of the synapse $s_i$ is significantly potentiated. If $\Delta t<0$, a time difference $\Delta t$ having a smaller absolute value means a smaller informational correlation between the firing of the neuron j and the input of the spike voltage, and thus, the weight $w_{ji}$ of the synapse $s_i$ is significantly depressed. In both cases of $\Delta t>0$ and $\Delta t<0$, the weight $w_{ji}$ hardly varies when $\Delta t$ has a large absolute value.

Figure 3:
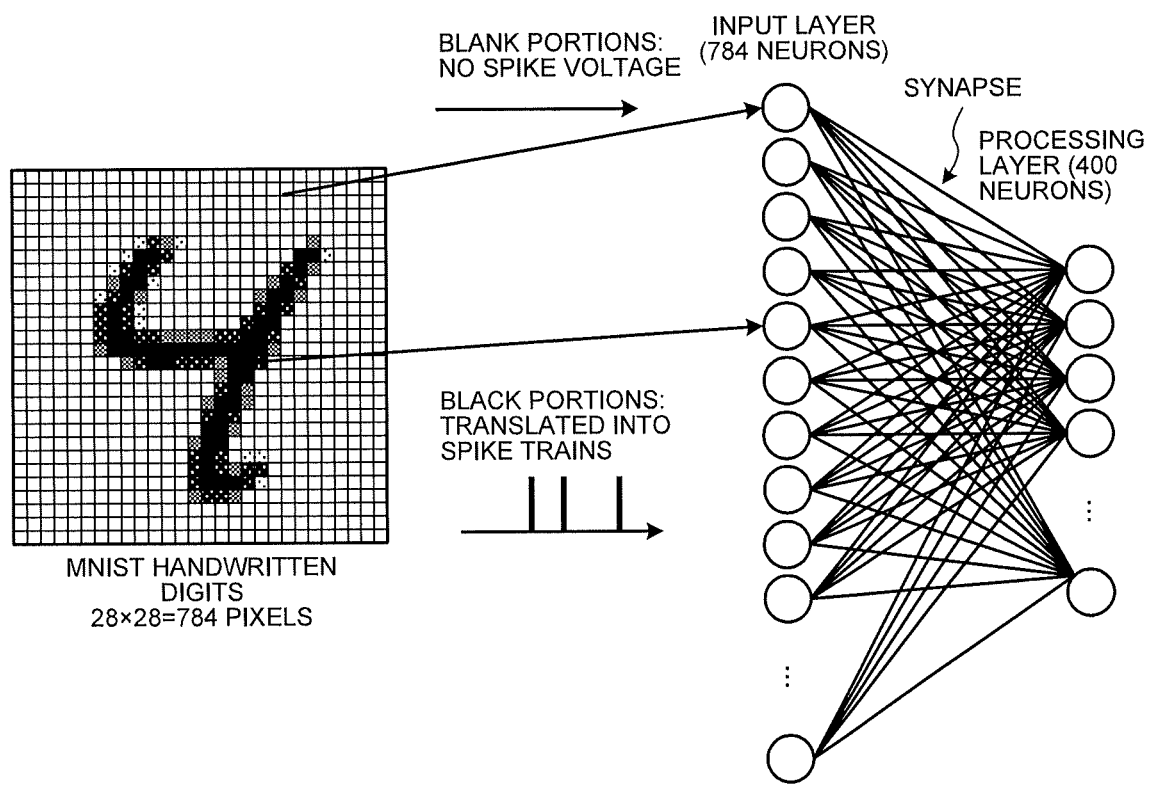
FIG. 3 is a diagram illustrating a specific example of how a spiking neural network learns.

Consider a case in which the spiking neural network is trained using image data of 28×28=784 pixels as illustrated in FIG. 3. In this case, contrasts of the pixels are input to 784 neurons in an input layer. The neurons in the input layer generate spike trains having spike densities corresponding to the contrasts and transmit spike voltages to downstream 400 neurons in a subsequent processing layer. The neurons in the input layer and the neurons in the processing layer are connected via synapses.

As described above, the neurons in the input layer generate spike trains corresponding to respective contrasts of the pixels. For a high-contrast pixel (black pixel), a spike train having a high spike density is generated. For a low-contrast pixel (white pixel), a spike train having a low spike density is generated. Neurons corresponding to blank portions of the input image generate no spike voltage. Accordingly, synapses connecting to the neurons corresponding to the blank portions of the input image transmit no spike voltage to the neurons in the processing layer. The weights of the synapses connecting to the neurons corresponding to the blank portions of the input image are neither potentiated nor depressed but are still in the initial state. In other words, the spiking neural network fails to learn information indicating "blankness".

Consider a case in which the spiking neural network illustrated in FIG. 3 learns the MNIST handwritten digit dataset (a set of handwritten digits from 0 to 9). In this learning, a probabilistic STDP approach is taken. In this approach, the synaptic weight is set to a discrete binary value (0 or 1), and if a neuron fires after receiving an input of a spike voltage via a synapse, the weight of the synapse is probabilistically set to 1, whereas if the neuron fires before receiving an input of a spike voltage via a synapse, the weight of the synapse is probabilistically set to 0. To incorporate a temporal correlation between an input of a spike voltage and the firing of a neuron into this approach, the probability is set depending on the time difference between the firing of the neuron and the input of the spike voltage via a synapse. Specifically, let the time difference be $\Delta t$, the probability of setting the synaptic weight to 0 (or 1) is proportional to $\exp(-\Delta t/T)$, where T is a constant.

Figure 4A:
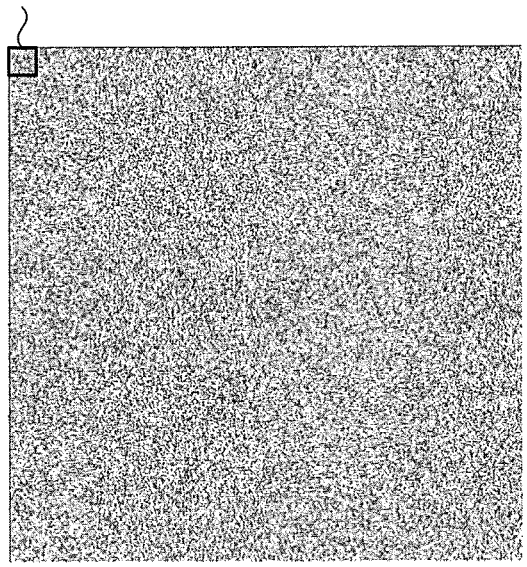
FIG. 4A is a diagram illustrating visualized weights of all the synapses illustrated in FIG. 3.
Figure 4B:
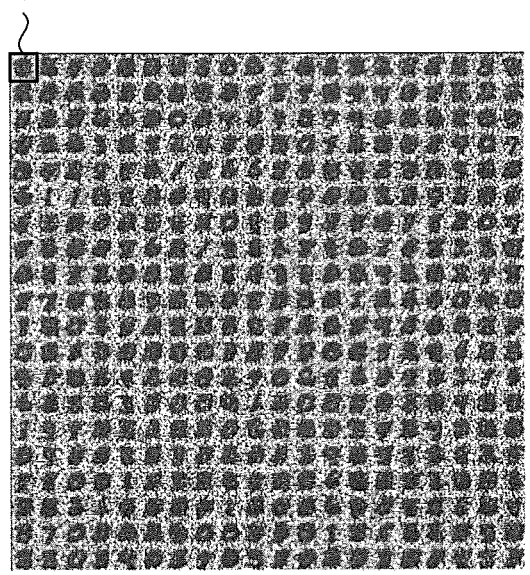
FIG. 4B is a diagram illustrating visualized weights of all the synapses illustrated in FIG. 3.

FIGS. 4A to 4C are diagrams illustrating visualized weights of all the synapses (784×400 synapses) connecting 784 neurons in the input layer with 400 neurons in the processing layer as illustrated in FIG. 3. In respective vertical and horizontal directions, $\sqrt{784 \times 400}=28 \times 20=560$ pixels are arranged and each pixel represents a corresponding synaptic weight. White pixels represent a synaptic weight of 0, whereas colored pixels represent a synaptic weight of 1. The weights of 560×560 synapses are grouped into 20×20 sections each including 28×28 pixels. Each section including 28×28 pixels corresponds to the entire synapses connecting to one neuron in the processing layer, and has a pattern representing the weight distribution of 28×28 synapses. This pattern is an image stored in the neuron in the processing layer.

As illustrated in FIG. 4A, first, all the individual synaptic weights are randomly set to an initial value of 0 or 1. The spiking neural network illustrated in FIG. 3 is trained using the MNIST handwritten digit dataset in this state. FIG. 4B illustrates synaptic weights after learning 60,000 patterns of handwritten digits. There are 20×20=400 patterns emerging in FIG. 4B. Each pattern includes 28×28 pixels. In other words, a pattern emerges in each section including 28×28 pixels and this pattern is an image stored in the neuron corresponding to this section.

Pixels corresponding to blank portions of the MNIST handwritten digits remain in the initial state because no spike voltage is input, and thus still have random patterns. At a center portion of each section, there is a seemingly overlapping pattern of many handwritten digits. When, for example, a neuron learns a handwritten digit of "0" and then learns "1", the blank portion of the handwritten digit "1" receives no spike voltage and thus the handwritten digit "0" remains in the blank portion. The neuron stores both "0" and "1" in an overlapping manner. Such operations are repeated and the neurons store patterns of overlapping handwritten digits.

When a recognition operation on the MNIST handwritten digits is performed by using the synaptic weight illustrated in FIG. 4B, the recognition rate is only about 10%. This result substantially equates to a random guess of the handwritten digits from 0 to 9. In other words, the spiking neural network fails to recognize the handwritten digits at all.

The essence of the problem is that neurons receive no spike voltage corresponding to blank data (i.e., blank portions of an image), and the weight of the synapses corresponding to these neurons are unchanged, whereby the synaptic weights are kept in the initial state or left un-updated with the previously stored information. Ideally, synaptic weights corresponding to blank data have to be depressed. As described above, the neural networks can learn blank data by implementing the synaptic normalization of the biological nervous systems.

FIG. 4C illustrates the learning results of a spiking neural network that learns based on the STDP rules and by implementing synaptic normalization in software. It is apparent from FIG. 4C that the synaptic normalization is successful in training the sections each including 28×28 pixels to learn the MNIST handwritten digits. In this example, the recognition rate on the handwritten digits reaches 89%. However, synaptic normalization requires the procedure of adding all the synaptic weights of each section including 28×28 pixels, dividing each synaptic weight by the sum, and rewriting the resulting values in the synapses. This procedure is not suited to hardware implementation.

In embodiments described below, a spiking neural network device having a novel configuration that depresses synaptic weights in accordance with a schedule independent from the time difference between an input of a spike voltage and firing of a neuron, and its learning method are disclosed.

First Embodiment

Figure 5:
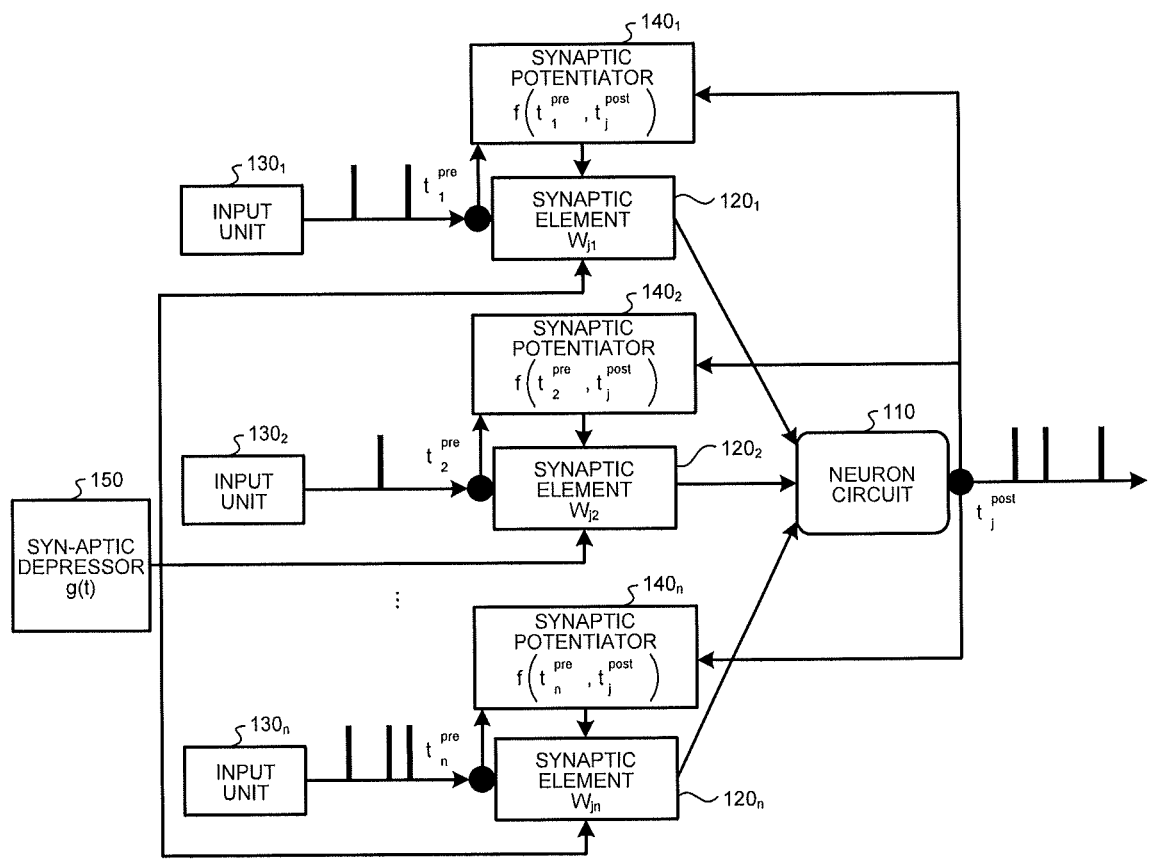
FIG. 5 is a diagram illustrating an example configuration of a spiking neural network device according to a first embodiment.

FIG. 5 is a diagram illustrating an example configuration of a spiking neural network device according to a first embodiment. As illustrated in FIG. 5, the spiking neural network device according to the first embodiment includes a neuron circuit 110, a plurality of synaptic elements $120_1$, $120_2$, ..., $120_n$ (which may be hereinafter collectively referred to as synaptic elements 120) connected to inputs of the neuron circuit 110, input units $130_1$, $130_2$, ..., $130_n$ (which may be hereinafter collectively referred to as input units 130) configured to input spike voltages to the neuron circuit 110 via the synaptic elements $120_1$, $120_2$, ..., $120_n$, respectively, synaptic potentiators $140_1$, $140_2$, ..., $140_n$ (which may be hereinafter collectively referred to as synaptic potentiators 140) configured to potentiate weight $w_{ji}$ of the synaptic elements 120 based on the STDP rules, and a synaptic depressor 150 configured to depress the weight $w_{ji}$ of the synaptic elements 120 in accordance with a schedule independent from firing timing of the neuron circuit 110 and input timing of spike voltages.

The neuron circuit 110 and the synaptic elements 120 of the spiking neural network device according to the first embodiment illustrated in FIG. 5 correspond to the neuron j and the synapses $s_i$ in FIG. 1, respectively. In the same manner as the example illustrated in FIG. 1, weights w of the synaptic elements $120_1$, $120_2$, ..., $120_n$ are referred to as weights $w_{j1}$, $w_{j2}$, ..., $w_{jn}$, respectively. The synaptic potentiators 140 correspond to partial STDPs (portions configured to potentiate the weight $w_{ji}$ of the synapses $s_i$) illustrated in FIG. 1. In other words, the spiking neural network device according to the first embodiment illustrated in FIG. 5 differs from the configuration illustrated in FIG. 1 in that it additionally includes the synaptic depressor 150 configured to depress the weight $w_{ji}$ of the synaptic elements 120 in accordance with an independent schedule.

Although FIG. 5 illustrates a single unit including one neuron circuit 110 of the spiking neural network device, the actual spiking neural network device includes a huge number of neuron circuits 110, and thus, as many numbers of units illustrated in FIG. 5 are combined to implement the device. The input units 130 in FIG. 5 correspond to presynaptic neuron circuits of the neuron circuit 110.

In the spiking neural network device according to the first embodiment, a spike voltage is released from an input unit 130 and input to the neuron circuit 110 via a synaptic element 120 connected to this input unit 130. The magnitude of the spike voltage input to the neuron circuit 110 increases if the synaptic element 120 has a large weight and decreases if the synaptic element 120 has a small weight $w_{ji}$.

The neuron circuit 110 integrates a spike voltage input from an input unit 130 via a synaptic element 120. If the integrated value exceeds a threshold, the neuron circuit 110 fires and releases a spike voltage to a downstream neuron circuit. When the neuron circuit 110 fires and releases a spike voltage, a potentiating operation is performed by the corresponding synaptic potentiator 140 to potentiate the weight $w_{ji}$ of the synaptic element 120.

The synaptic potentiators 140 perform the potentiating operation to potentiate the weight $w_{ji}$ of the synaptic elements 120 based on the STDP rules. Whether the weight $w_{ji}$ of the synaptic elements 120 is actually potentiated when the synaptic potentiators 140 perform the potentiating operations may be probabilistic or deterministic. The probability or rate of potentiation of a weight $w_{ji}$ is determined by a function $f(t_i^{pre}, t_j^{post})$ where $t_i^{pre}$ is time at which a spike voltage is input to a synaptic element 120 and $t_j^{post}$ is time at which the neuron circuit 110 fires. In other words, when the synaptic potentiator 140 performs a potentiating operation, the weight $w_{ji}$ of the synaptic element 120 is potentiated at a probability or rate in accordance with the function $f(t_i^{pre}, t_j^{post})$ that depends on the firing timing of the neuron circuit 110 and the input timing of the spike voltage.

The synaptic depressor 150 depresses the weight $w_{ji}$ of the synaptic elements 120 in accordance with a schedule g(t) defined independently from the firing timing of the neuron circuit 110 and the input timing of a spike voltage. In the schedule g(t), t indicates simple time or a parameter corresponding to time (parameter indicating the progress of neural network processing). The schedule g(t) is independent from the firing timing of the neuron circuit 110 and the input timing of the spike voltage. Whether the weight $w_{ji}$ of the synaptic elements 120 is actually depressed when the synaptic depressor 150 performs a depression operation may be probabilistic or deterministic. In other words, when the synaptic depressor 150 performs a depression operation in accordance with the schedule g(t), the weights $w_{j1}$, $w_{j2}$, ..., $w_{jn}$ of the synaptic elements $120_1$, $120_2$, ..., $120_n$ may be depressed at a predetermined probability (e.g., 0.1%) or collectively depressed by a predetermined depression rate (e.g., 0.1% of the maximum value of the weight w).

Synaptic weight in biological neural networks is known to potentiate or depress probabilistically. In this regard, if the spiking neural network device is configured to potentiate the weight $w_{ji}$ of the synaptic elements 120 upon a potentiating operation of the synaptic potentiators 140 and depress the weight $w_{ji}$ of the synaptic elements 120 upon a depression operation of the synaptic depressor 150 in a probabilistic manner, this probabilistic configuration is considered to be more successful in faithfully mimicking the information processing scheme of the biological neural networks.

The following describes a specific example of a learning operation of the spiking neural network device according to the first embodiment. Suppose that, in this example, the weight of the synaptic elements 120 is a discrete binary having a value of 0 or 1 and the weight $w_{ji}$ of the synaptic elements 120 is potentiated and depressed probabilistically. Consider a case in which a plurality of the units illustrated in FIG. 5 are combined to configure the spiking neural network illustrated in FIG. 3 and this spiking neural network is trained using the MNIST handwritten digit dataset. In this case, the neuron circuit 110 corresponds to each neuron in the processing layer in FIG. 3, and the input units 130 correspond to the neurons in the input layer in FIG. 3.

The schedule g(t) of the depression operation performed by the synaptic depressor 150 is defined as follows:

g(t): a depression operation is performed on the weight $w_{ji}$ of all the synaptic elements 120 every time one handwritten digit is input.

In a depression operation, the weight $w_{ji}$ of the synaptic elements 120 is depressed from 1 to 0 at a probability q. The weight $w_{ji}$ of the synaptic elements 120 will never be depressed in any other event.

The function $f(t_i^{pre}, t_j^{post})$, based on which the synaptic potentiators 140 perform the potentiating operation, is defined as follows:

$f(t_i^{pre}, t_j^{post})$ $t_i^{pre} < t_j^{post}$ and if no spike voltage is input to the same synaptic element 120 between $t_i^{pre}$ and $t_j^{post}$ (that is, if a spike voltage input at $t_i^{pre}$ is identical to the spike voltage input immediately before the firing of the neuron circuit 110), the weight $w_{ij}$ of the synaptic element 120 is potentiated to 1 at a probability $A\exp((t_i^{pre}-t_j^{post})/T)$, where A and T are constants. The weight $w_{ij}$ will never be potentiated in any other events.

Figure 6:
FIG. 6 is a diagram illustrating example learning results of the spiking neural network device according to the first embodiment.

The spiking neural network device according to the first embodiment configured as described above learns the MNIST handwritten digit dataset and the results of the learning operation are illustrated in FIG. 6. In the same manner as in the example illustrated in FIG. 4B, FIG. 6 illustrates the learning results of 20×20=400 sections each including 28×28 pixels. Handwritten digits clearly emerge in all the sections indicating that the neurons corresponding to the sections have successfully learned the handwritten digits. When the spiking neural network device actually performs a recognition operation on the MNIST handwritten digits using the synaptic weights, the recognition rate reaches about 78%. This means that the spiking neural network has been trained appropriately.

The learning results of this example significantly differ from those of the example in FIG. 4B in that no pixels corresponding to the blank portions of the handwritten digits keep the initial value of 1 and that the center of each section has no overlapping handwritten digits. This is because blank information is reflected on the weight $w_{ji}$ of the synaptic elements 120 in the depression operation performed in accordance with the schedule g(t) and the initial distribution of the weight $w_{ji}$ of the synaptic elements 120 or the past learning results can be deleted as necessary. As a result, the spiking neural network can learn the handwritten digits correctly. It should be noted that the spiking neural network device according to the first embodiment does not implement the synaptic normalization. Since the spiking neural network device includes the synaptic depressor 150 that performs the depression operation in accordance with the schedule g(t), it can learn the blank information without implementing the synaptic normalization and is suitable for hardware implementation.

For implementing the synaptic elements 120 in the first embodiment in specific hardware, non-volatile memories can be used. In other words, information stored in the non-volatile memories may be used as the weight $w_{ji}$ of the synaptic elements 120 (synapses $s_i$). By using the non-volatile memories and the writing scheme corresponding to the characteristics of the memories, the spiking neural network device can potentiate the weight $w_{ji}$ of the synapses $s_i$ depending on the firing timing of the neuron circuit 110 and the input timing of a spike voltage and depress the weight $w_{ji}$ of the synapses $s_i$ in accordance with the schedule g(t) independent from the firing timing of the neuron circuit 110 and the input timing of the spike voltage.

Non-volatile memories suitable for implementing the synaptic elements 120 are, for example, resistive random-access memories. The resistive random-access memories are made from a thin film or a laminate of metal oxide such as hafnium oxide ($HfO_x$), titanium oxide ($TiO_x$), tantalum oxide ($TaO_x$), aluminum oxide ($AlO_x$), tungsten oxide ($WO_x$), magnesium oxide ($MgO_x$), and strontium titanate (SrTiO) sandwiched between electrodes, or made from a thin film or a laminate of solid ion conductor such as silicon oxide ($SiO_x$), tantalum oxide ($TaO_x$), germanium sulfide (GeS), and germanium selenide (GeSe) sandwiched between electrodes. The resistive state of the resistive random-access memories varies upon application of a voltage equal to or higher than a threshold. Alternatively, the resistive random-access memories may be made from a ferroelectric thin film such as hafnium oxide ($HfO_x$) or hafnium silicon oxide ($HfSiO_x$) sandwiched between electrodes. Application of voltage equal to or higher than a threshold changes the polarization state of the ferroelectric thin film, thereby changing the resistive state. The resistive state stored in the resistive random-access memories can be used as the weight $w_{ji}$ of the synapses $s_i$.

Figure 7:
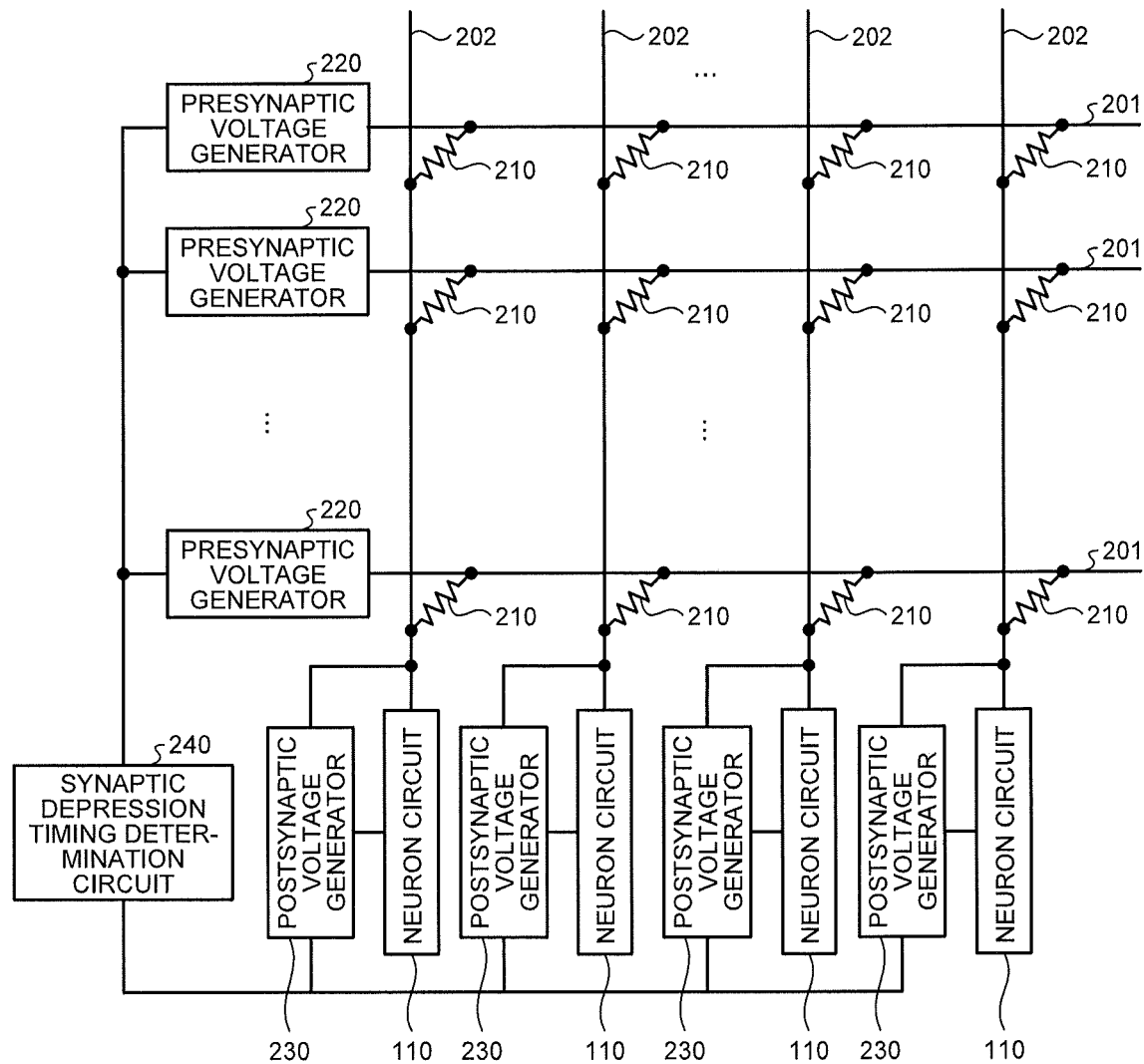
FIG. 7 is a diagram illustrating an example hardware configuration of the spiking neural network device including resistive random-access memories as synaptic elements.

Described next is a specific example of the hardware configuration including the resistive random-access memories as the synaptic elements 120. FIG. 7 is a diagram illustrating an example hardware configuration of the spiking neural network device including resistive random-access memories as the synaptic elements 120.

A plurality of horizontal wires (word lines) 201 and a plurality of vertical wires (bit lines) 202 cross each other. At the intersections of the word lines 201 and the bit lines 202, resistive random-access memories 210 functioning as the synaptic elements 120 are connected. One word line 201 is electrically connected with one bit line 202 only via one resistive random-access memory 210.

The word lines 201 are each connected to a presynaptic voltage generator 220. The presynaptic voltage generator 220 inputs a voltage signal (presynaptic voltage) corresponding to a spike voltage to the word line 201 upon firing of a presynaptic neuron. The bit lines 202 are each connected to a neuron circuit 110 and a postsynaptic voltage generator 230. The postsynaptic voltage generator 230 inputs a certain voltage signal (postsynaptic voltage) to the bit line 202 upon firing of the neuron circuit 110.

Figure 8:
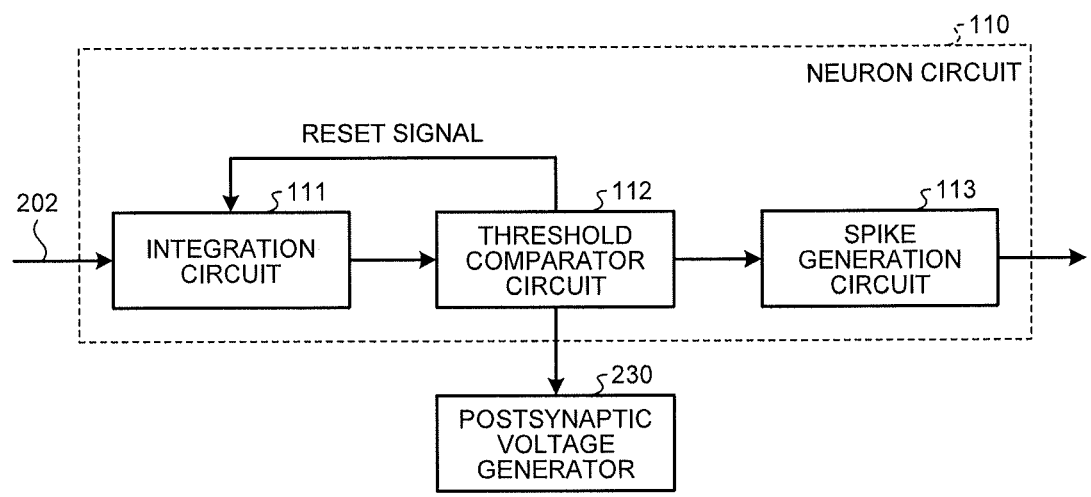
FIG. 8 is a diagram illustrating an example configuration of a neuron circuit.

FIG. 8 illustrates an example configuration of the neuron circuit 110. As illustrated in FIG. 8, for example, the neuron circuit 110 includes an integration circuit 111 that integrates the current flowing in the bit line 202, a threshold comparator circuit 112 that compares an output of the integration circuit 111 with a threshold, a spike generation circuit 113 that generates and outputs a spike voltage (fires) if the output of the integration circuit 111 exceeds the threshold. When the output of the integration circuit 111 exceeds the threshold and the spike generation circuit 113 outputs a spike voltage, the threshold comparator circuit 112 outputs a reset signal to reset the integration circuit 111.

When the presynaptic voltage generator 220 inputs a presynaptic voltage to the word line 201, electric current flows into the bit lines 202 via the resistive random-access memories 210 connected to the word line 201. In each neuron circuit 110, the current flowing in the bit line 202 is integrated in the integration circuit 111 and the integrated value is compared with a preset threshold in the threshold comparator circuit 112. If the integrated value exceeds the threshold, the spike generation circuit 113 outputs a spike voltage. In other words, firing occurs. The value of the current flowing from the word line 201 to the bit lines 202 is determined depending on the resistive state of the resistive random-access memories 210. In this regard, the resistive state of the resistive random-access memories 210 can be regarded as the weight $w_{ji}$ of the synapses $s_i$. A lower resistance of a resistive random-access memory 210 means a larger weight $w_{ji}$ since a lower resistance allows a larger current to flow, whereas a higher resistance of a resistive random-access memory 210 means a smaller weight since a higher resistance only allows a smaller current to flow.

Figure 9:
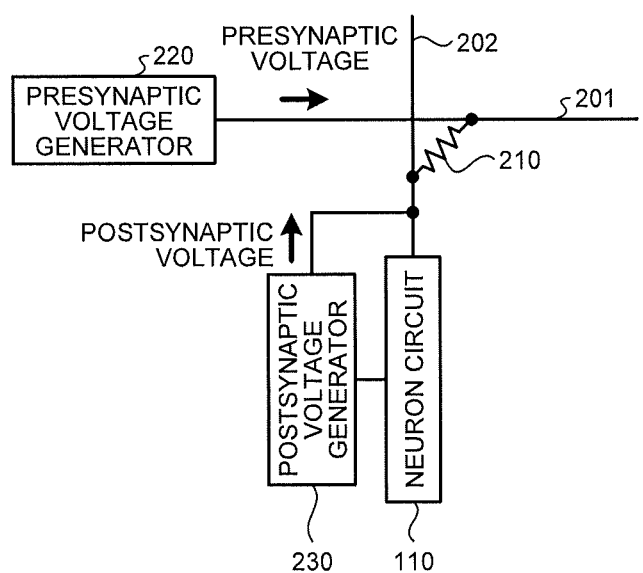
FIG. 9 is a diagram illustrating an example potentiating operation.

When the neuron circuit 110 fires, the postsynaptic voltage generator 230 applies a postsynaptic voltage to the bit line 202 as illustrated in FIG. 9. To the resistive random-access memory 210, a voltage is applied corresponding to a difference between the presynaptic voltage applied to the word line 201 and the postsynaptic voltage applied to the bit line 202. If the difference is larger than a constant value Vth, the resistive state of the resistive random-access memory 210 changes.

Figure 10:
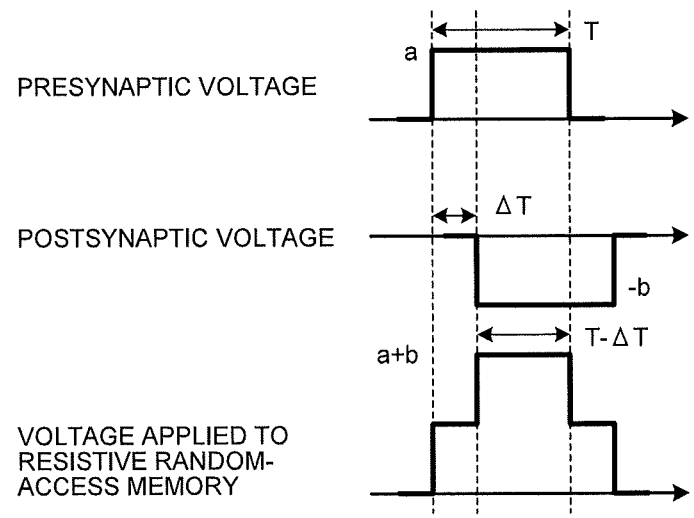
FIG. 10 is a diagram illustrating an example potentiating operation.

As illustrated in FIG. 10, for example, suppose that a rectangular wave voltage having an amplitude a and a duration T is input to the word line 201 as a presynaptic voltage signal, the neuron circuit 110 fires $\Delta t$ later, and a rectangular wave voltage having an amplitude −b is applied to the bit line 202 as a postsynaptic voltage, where 0<a<Vth, 0<b<Vth, and a+b>Vth. In this case, a voltage having an amplitude a+b is applied to the resistive random-access memory 210 for a time T−$\Delta t$. Application of this voltage changes the resistive state of the resistive random-access memory 210. The polarity of the voltage a+b is set such that the application of the voltage reduces the resistance of the resistive random-access memory 210.

The resistive state of the resistive random-access memory 210 varies depending on the voltage application time T−$\Delta t$.

Figure 11:
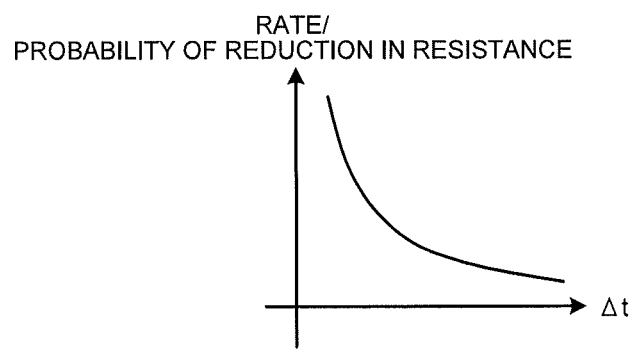
FIG. 11 is a graph illustrating a rate/probability of reduction in resistance of a resistive random-access memory relative to a time difference $\Delta t$.

If the resistive state of the resistive random-access memories 210 varies in a deterministic manner, a smaller Δt leads to a longer voltage application time T−Δt, resulting in a higher reduction rate of resistance, whereas a larger Δt leads to a shorter voltage application time T−Δt, resulting in a lower reduction rate of resistance (see FIG. 11). In other words, if the application of the postsynaptic voltage triggered by firing of the neuron circuit 110 occurs more immediately after the application of the presynaptic voltage, the rate of reduction in the resistance of the resistive random-access memory 210 and the rate of potentiation of the weight $w_{ji}$ of the synapse $s_i$ increase. If firing of the neuron circuit 110 and application of the postsynaptic voltage occur much later after the application of the presynaptic voltage, the rate of reduction in the resistance of the resistive random-access memory 210 and the rate of potentiation of the weight $w_{ji}$ of the synapse $s_i$ decrease.

If the resistive state of the resistive random-access memories 210 varies in a probabilistic manner, a smaller Δt leads to a longer voltage application time T−Δt and thus the resistance is reduced at a higher probability, whereas a larger Δt leads to a shorter voltage application time T−Δt and thus the resistance is reduced at a lower probability (see FIG. 11). In other words, if the application of the postsynaptic voltage triggered by firing of the neuron circuit 110 occurs more immediately after the application of the presynaptic voltage, the probability of reduction in the resistance of the resistive random-access memory 210 and the probability of potentiation of the weight $w_{ji}$ of the synapse $s_i$ increase. If firing of the neuron circuit 110 and application of the postsynaptic voltage occur much later after the application of the presynaptic voltage, the probability of reduction in the resistance of the resistive random-access memory 210 and the probability of potentiation of the weight $w_{ji}$ of the synapse $s_i$ decrease.

Figure 12:
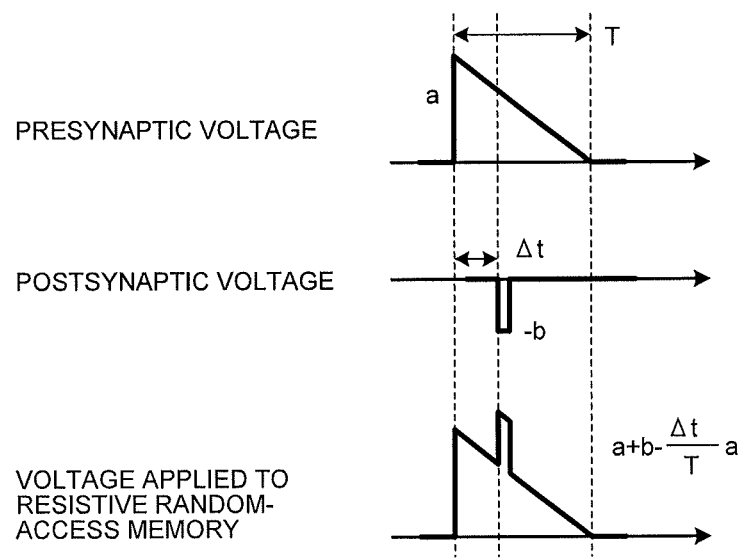
FIG. 12 is a diagram illustrating an example potentiating operation.

Alternatively, as illustrated in FIG. 12, for example, suppose that a triangular wave voltage having an initial amplitude of a and linearly decaying to 0 in a duration T is input to the word line 201 as a presynaptic voltage signal, the neuron circuit 110 fires Δt later, and a spike voltage having an amplitude −b is applied to the bit line 202 as a postsynaptic voltage. In this case, a spike voltage having an amplitude a+b−Δt·a/T is applied to the resistive random-access memory 210. The polarity of the spike voltage applied to the resistive random-access memory 210 is set such that the application of the voltage reduces the resistance of the resistive random-access memory 210.

In this example, a smaller Δt leads to a higher amplitude of the spike voltage to be applied to the resistive random-access memory 210. Thus, the resistance of the resistive random-access memory 210 is reduced at a higher rate or probability (see FIG. 11). Alternatively, a larger Δt leads to a lower amplitude of the spike voltage to be applied to the resistive random-access memory 210. Thus, the resistance of the resistive random-access memory 210 is reduced at a lower rate or probability (see FIG. 11). In this example, if the application of the postsynaptic voltage triggered by firing of the neuron circuit 110 occurs more immediately after the application of the presynaptic voltage, the rate of potentiation of the weight $w_{ji}$ of the synapse $s_i$ increases or the probability of potentiation of the weight $w_{ji}$ of the synapse $s_i$ increases. If firing of the neuron circuit 110 and application of the postsynaptic voltage occur much later after the application of the presynaptic voltage, the rate or the probability of potentiation of the weight $w_{ji}$ of the synapse $s_i$ decreases.

As described above, if the spiking neural network device has the hardware configuration illustrated in FIG. 7, the resistive state (corresponding to the weight $w_{ji}$ of the synapses $s_i$) of the resistive random-access memories 210 as the synaptic elements 120 varies depending on the timing at which the postsynaptic voltage generator 230 applies a postsynaptic voltage to the bit line 202 upon firing of the neuron circuit 110. In other words, the postsynaptic voltage generator 230 corresponds to the synaptic potentiator 140 illustrated in FIG. 5.

With regard to the depression operation for depressing the weight $w_{ji}$ of the synapses $s_i$, a synaptic depression timing determination circuit 240 illustrated in FIG. 7 determines the timing of the depression operation in accordance with the schedule g(t). When the depression operation timing comes, the synaptic depression timing determination circuit 240 transmits signals to the presynaptic voltage generators 220 and to the postsynaptic voltage generators 230 to trigger the depression operation for increasing the resistance value of the resistive random-access memories 210, that is, for depressing the weight $w_{ji}$ of the synapses $s_i$.

The synaptic depression timing determination circuit 240 determines whether the timing of the depression operation defined by the schedule g(t) has come. Specifically, for example, it determines whether pre-scheduled time has come or whether timing corresponding to a progress of the neural network processing has come (e.g., timing after one handwritten digit is input). If the synaptic depression timing determination circuit 240 determines that the depression operation timing has come, for example, it transmits an instruction to the presynaptic voltage generators 220 to apply voltage to the word lines 201 and also transmits an instruction to the postsynaptic voltage generators 230 to ground the bit lines 202. Accordingly, voltages are applied from the word lines 201 to the resistive random-access memories 210 disposed at the intersections between the word lines 201 and the bit lines 202. The polarity, amplitude, and application time of the voltage are set such that the resistance value of the resistive random-access memories 210 increases at a desired rate or at a desired probability. Application of the voltage increases the resistance value of the resistive random-access memories 210 and can depress the weight $w_{ji}$ of the synapses $s_i$ in a probabilistic or deterministic manner.

In the spiking neural network device having the hardware configuration illustrated in FIG. 7, the depression operation is implemented such that the presynaptic voltage generators 220 apply voltage to the word lines 201 and the postsynaptic voltage generators 230 ground the bit lines 202 at the depression operation timing determined by the synaptic depression timing determination circuit 240, and voltage is applied to the resistive random-access memories 210 from the word lines 201. The synaptic depression timing determination circuit 240, the presynaptic voltage generators 220, and the postsynaptic voltage generators 230 implement the synaptic depressor 150 illustrated in FIG. 5.

The hardware configuration illustrated in FIG. 7 is a specific example of the hardware configuration for implementing the spiking neural network device according to the first embodiment, and the hardware configuration for implementing the spiking neural network device according to the first embodiment is not limited to the example illustrated in FIG. 7. The spiking neural network device according to the first embodiment may have any configuration that can potentiate the weight $w_{ji}$ of the synaptic elements 120 depending on the input timing of the spike voltage and the firing timing of the neuron circuit 110 and can depress the weight $w_{ji}$ of the synaptic elements 120 in accordance with the schedule g(t) independent from the input timing of the spike voltage and the firing timing of the neuron circuit 110.

As described with reference to the specific examples above, the spiking neural network device according to the first embodiment includes, as a learning mechanism for a spiking neural network, the synaptic potentiators 140 configured to potentiate the weight $w_{ji}$ of the synaptic elements 120 depending on the input timing of the spike voltage and the firing timing of the neuron circuit 110 and the synaptic depressor 150 configured to depress the weight $w_{ji}$ of the synaptic elements 120 in accordance with the schedule g(t) independent from the input timing of the spike voltage and the firing timing of the neuron circuit 110. The spiking neural network device can appropriately learn blank data indicating "nothing" such as blank portions of handwritten digits, or in other words, information having a low spike density. This configuration eliminates the need for preparing two sets of spiking neural networks for learning information having a low spike density, which is disclosed in S. Sidler, A. Pantazi, S. Wozniak, Y. Leblebici, and E. Eleftheriou, "Unsupervised learning using phase-change synapses and complementary patterns", International Symposium on Artificial Neural Networks (Springer 2017), pp. 281-288. The spiking neural network device according to the first embodiment can learn information having a low spike density without increasing the device size or energy consumption necessary for the learning.

Second Embodiment

Figure 13:
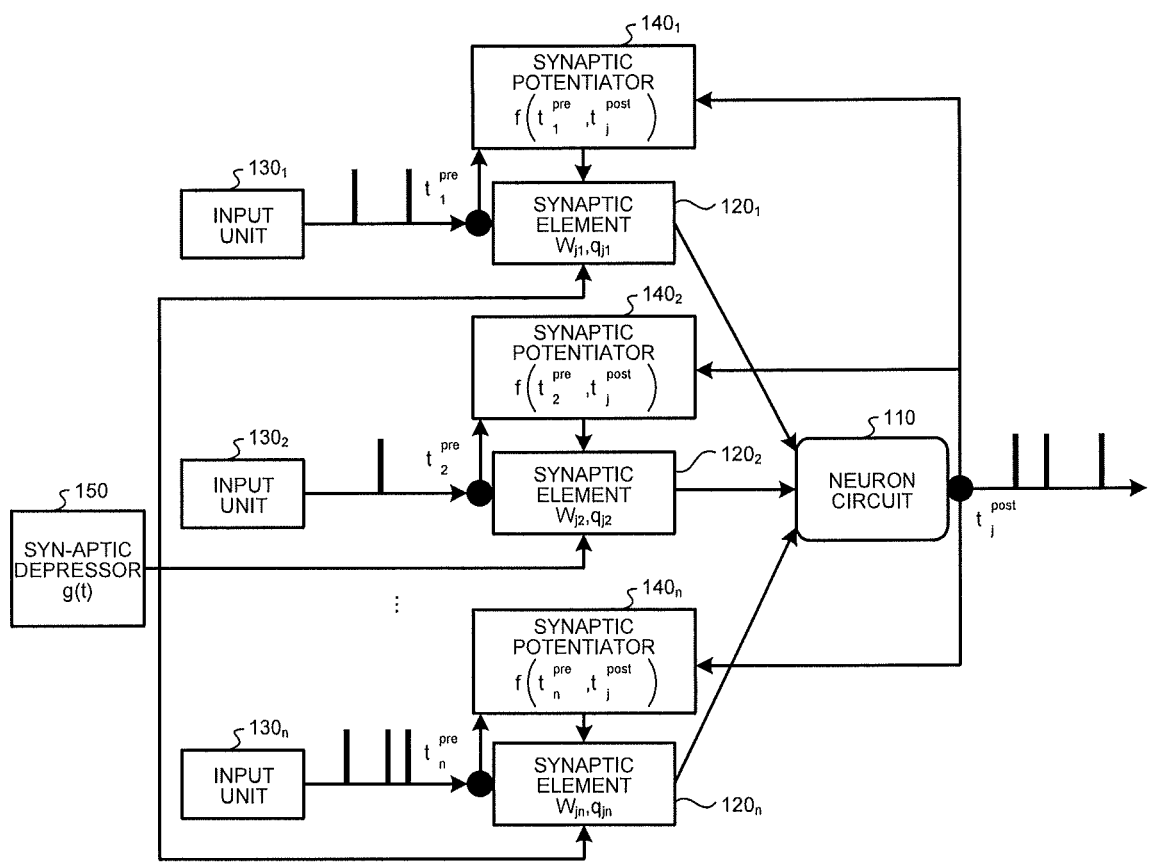
FIG. 13 is a diagram illustrating an example configuration of a spiking neural network device according to a second embodiment.

FIG. 13 is a diagram illustrating an example configuration of a spiking neural network device according to a second embodiment. As illustrated in FIG. 13, the spiking neural network device according to the second embodiment includes a plurality of synaptic elements $120_1$, $120_2$, ..., $120_n$ having weights $w_{j1}$, $w_{j2}$, ..., $w_{jn}$ and also having internal variables $q_{j1}$, $q_{j2}$, ..., $q_{jn}$, respectively. The other configurations and the basic operation of this spiking neural network device are the same as those of the first embodiment, and thus the following only describes the differences between the first embodiment and the second embodiment.

In the spiking neural network according to the second embodiment, the internal variables $q_{ji}$ of the synaptic elements 120 define the probability or rate at which the weight $w_{ji}$ of the synaptic elements 120 is depressed in the depression operation. The value of the internal variables $q_{ji}$ of the synaptic elements 120 is determined depending on the firing history of the neuron circuit 110.

The following describes a specific example of a learning operation of the spiking neural network device according to the second embodiment with reference to the same examples as those of the first embodiment. That is, the weight $w_{ji}$ of the synaptic elements 120 is a discrete binary having a value of 0 or 1 and the weight $w_{ji}$ of the synaptic elements 120 is potentiated and depressed probabilistically. Consider a case in which a plurality of the units illustrated in FIG. 13 are combined to configure the spiking neural network illustrated in FIG. 3 and this spiking neural network is trained using the MNIST handwritten digit dataset. The schedule g(t) for the depression operation and the condition $f(t_i^{pre}, t_j^{post})$ for the potentiating operation are the same as those of the first embodiment above. The internal variables $q_{ji}$ represent the probabilities (depression probabilities) at which the weight $w_{ij}$ of the synaptic elements 120 are depressed from 1 to 0 in a depression operation performed in accordance with the schedule g(t).

If the weight $w_{ij}$ of a synaptic element 120 is 1 and the neuron circuit 110 fires, the spike voltage input to the neuron circuit 110 via this synaptic element 120 is considered to contribute to the firing of the neuron circuit 110 (if the weight $w_{ij}$ is 0, the spike voltage never contributes to the firing of the neuron circuit 110). In other words, the connection of the synaptic element 120 having the weight $w_{ij}$ of 1 can be considered important for the firing of the neuron circuit 110. To maintain the weight $w_{ij}$ of 1 as much as possible, the value of the internal variable $q_{ji}$ of the synaptic element 120 having the weight $w_{ij}$ of 1 is reduced to reduce the probability of depression.

Figure 14:
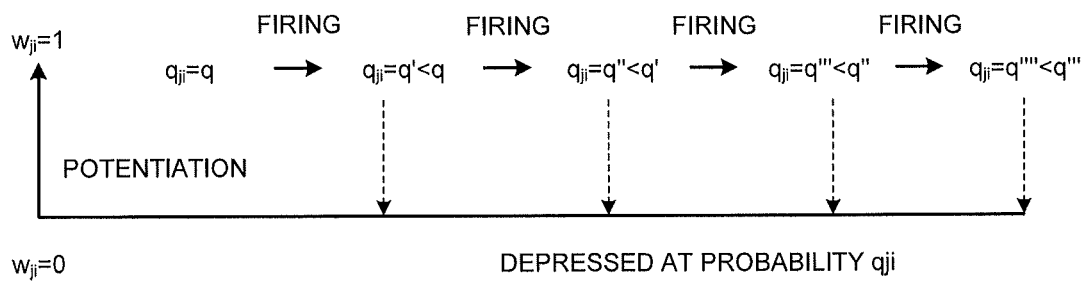
FIG. 14 is a diagram illustrating an example of how an internal variable of a synaptic element varies.

As illustrated in FIG. 14, for example, when the weight $w_{ij}$ of a synaptic element 120 is potentiated from 0 to 1, the internal variable $q_{ji}$ of this synaptic element 120 is set to an initial value q. The more times the neuron circuit 110 fires, the smaller the internal variable $q_{ji}$ becomes than the current one. In other words, every time the neuron circuit 110 fires, the internal variable $q_{ji}$ of the synaptic element 120 varies from q', q'', q''', ..., where, q>q'>q''>q''' .... As more firing events of the neuron circuit 110 occur with the synaptic element 120 having the weight $w_{ij}$ of 1, the weight $w_{ij}$ of the synaptic element 120 becomes less likely to decrease and more likely to keep the value of 1. In other words, this configuration can prevent deletion of important information when the synaptic depressor 150 performs the depression operation in accordance with the schedule g(t), thereby further increasing the learning accuracy.

Figure 15:
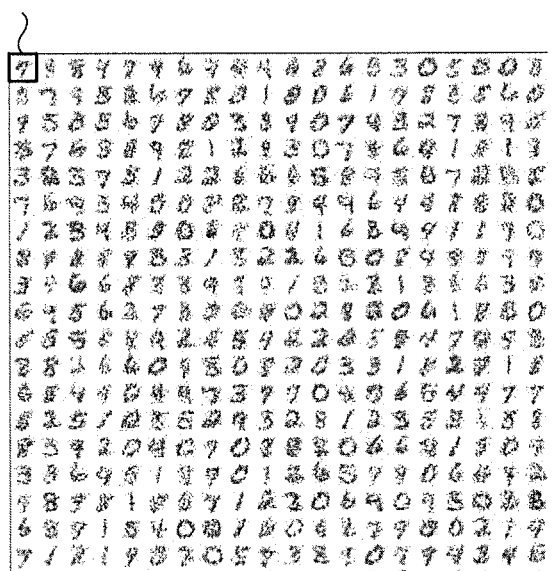
FIG. 15 is a diagram illustrating example learning results of the spiking neural network device according to the second embodiment.

The spiking neural network device according to the second embodiment configured as described above learns the MNIST handwritten digit dataset and the results of the learning operation are illustrated in FIG. 15. In this example, q=0.1%, q'=q/2, q''=q'/2, and q'''=q''/2. When a recognition operation on the MNIST handwritten digits is performed using the synaptic weights illustrated in FIG. 15, the recognition rate reaches about 81.1%, which is higher than that of the recognition operation using the synaptic weights illustrated in FIG. 6 that are the learning results of the first embodiment.

The spiking neural network device according to the second embodiment includes internal variables $q_{ji}$ in addition to the weight $w_{ji}$ of the synaptic elements 120. When the weight $w_{ji}$ of a synaptic element 120 is 1 (already potentiated) and the neuron circuit 110 fires, the internal variable $q_{ji}$ in the synaptic element 120 reduces the probability at which the weight $w_{ji}$ of the synaptic element 120 is depressed to 0. Typically, implementing this configuration specific to the second embodiment in hardware requires as many numbers of additional memory elements as the increased number of variables. However, the internal variables $q_{ji}$ can be implemented by using, for example, the resistive random-access memories 210 illustrated in FIG. 7 as the synaptic elements 120 without increasing the number of memory elements.

Figure 16A:
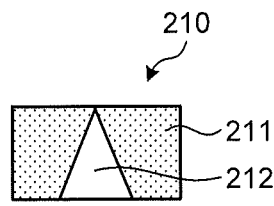
FIG. 16A is a diagram illustrating how an internal state of a resistive random-access memory varies.

Suppose that a resistive random-access memory 210 is in a low resistive state (weight $w_{ji}$=1). If the resistive random-access memory 210 is made from, for example, a metal oxide thin film or a solid ion conductor thin film, this low resistive state is such that a conductor pathway vertically passes through a film insulator 211 as illustrated in FIG. 16A. The conductor pathway is formed by a conductor portion 212 such as oxygen vacancies or metallic ions formed inside the insulator 211.

Figure 16B:
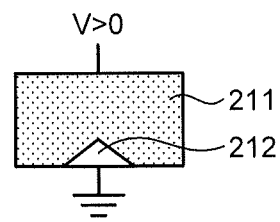
FIG. 16B is a diagram illustrating how the internal state of the resistive random-access memory varies.

Suppose that a depression operation is performed in this state. Specifically, a positive voltage (having an amplitude higher than the constant value Vth) is applied to the insulator film from above, and the oxygen vacancies or metallic ions, which have positive charge, move downward. As illustrated in FIG. 16B, the conductor portion 212 shrinks and the conductor pathway passing through the insulator 211 disappears, whereby the resistive state of the resistive random-access memory 210 is changed to a high resistive state (weight $w_{ji}$=0). This change in resistive state depends on the distribution of oxygen vacancies or metallic ions inside, and thus occurs probabilistically. Let this probability be q.

Alternatively, suppose that the resistive random-access memory 210 is in a high resistive state (weight $w_{ji}$=0) and receives a postsynaptic voltage, and a negative voltage (having an amplitude higher than the constant value Vth) is applied to the insulator film from above. In this case, the oxygen vacancies or metallic ions move upward, thereby increasing the conductor portion 212 and forming the conductor pathway again that vertically passes through the insulator 211. The resistive state of the resistive random-access memory 210 is changed to a low resistive state (weight $w_{ji}$=1).

Consider a case in which the resistive random-access memory 210 is in a low resistive state (weight $w_{ji}$=1) as illustrated in FIG. 16A and receives a postsynaptic voltage upon firing of the neuron circuit 110, that is, a case in which a negative voltage is applied to the insulator film from above. In this case, the conductor pathway is already formed inside the insulator film. Upon application of voltage, the oxygen vacancies or metallic ions forming the conductor portion 212 are attracted upward in the insulator film, and then the conductor pathway in the upper portion of the insulator film is widened, or potentiated, as illustrated in FIG. 16C.

If a depression operation is performed in this state, the oxygen vacancies or metallic ions move downward. However, the wider conductor pathway in the upper portion of the insulator film than the pathway illustrated in FIG. 16A prevents the conductor pathway from disappearing, and thus the resistive random-access memory 210 will not be easily changed to a high resistive state (weight $w_{ji}$=0). In other words, let the probability of the resistive random-access memory 210 becoming a high resistive state (weight $w_{ji}$=0) from the state of FIG. 16C in a depression operation be q', q>q'.

Figure 16C:
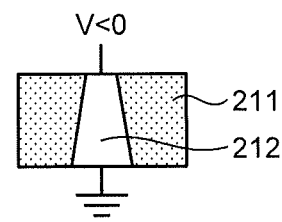
FIG. 16C is a diagram illustrating how the internal state of the resistive random-access memory varies.

If the resistive random-access memory 210 in the state of FIG. 16C receives a postsynaptic voltage again upon firing of the neuron circuit 110, the conductor pathway in the upper portion of the insulator film further widens, thereby further reducing the probability of the resistive random-access memory 210 becoming the high resistive state (weight $w_{ji}$=0) in a depression operation. In other words, let this probability be q", q>q'>q". As described above, using the properties of the resistive random-access memories 210 can implement the internal variables of the synaptic elements 120 (i.e., depression probabilities of the weight $w_{ji}$ of the synaptic elements 120) that vary in accordance with the internal states as illustrated in FIG. 14.

Figure 17:
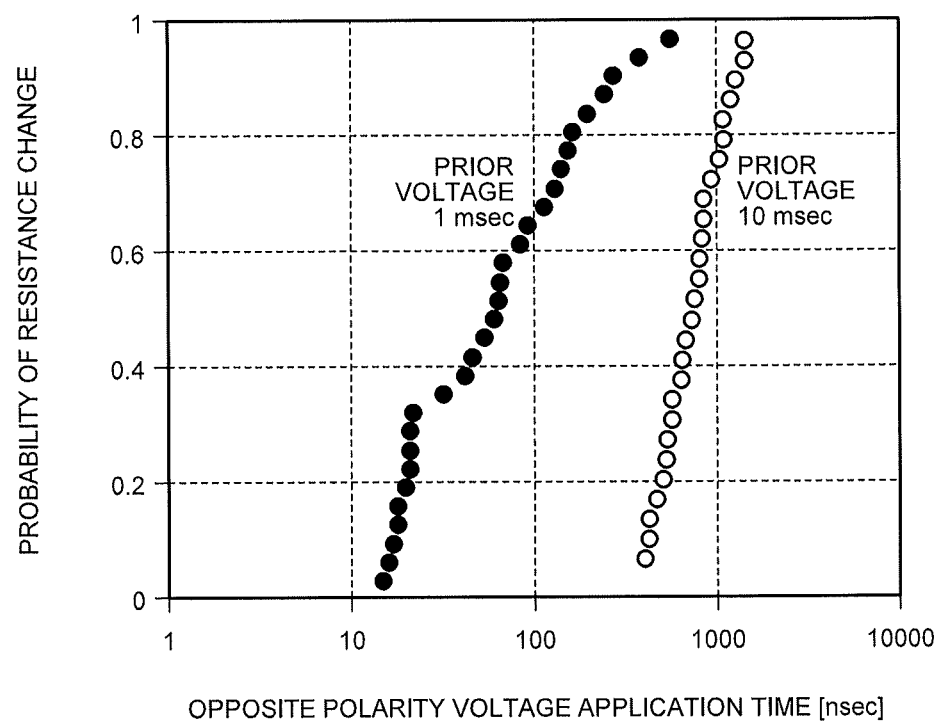
FIG. 17 is a graph illustrating probability of resistance change in the resistive random-access memory relative to opposite polarity voltage application time and magnitude of prior voltage applied to the resistive random-access memory.

FIG. 17 is a graph illustrating the probability of resistance change relative to opposite polarity voltage application time. Specifically, to obtain the graph, first, a prior voltage is applied to the resistive random-access memory 210 made from a metal oxide thin film for a certain time, and then, an opposite polarity voltage is applied to change the resistive state. According to the graph, application of the prior voltage for 10 milliseconds reduces the probability of resistance change, compared to application of the prior voltage for one millisecond. Considering the prior voltage to be the postsynaptic voltage and the opposite polarity voltage to be the voltage applied in the depression operation, it is apparent that the more times the neuron circuit 110 fires and the more times the postsynaptic voltage is applied, the lower the depression probability of the weight $w_{ji}$ becomes.

Although the resistive random-access memories 210 have been described above, the same discussion can be applied to typical non-volatile memories. The typical non-volatile memories can also implement the internal variables $q_{ji}$ of the synaptic elements 120 by using their internal physical states, since they operate using the internal physical states such as charge storage amounts and polarization.

In the spiking neural network device according to the second embodiment, the method of implementing the internal variables $q_{ji}$ of the synaptic elements 120 is not limited to using the change in the internal physical states of the non-volatile memories. For example, the spiking neural network device may include storage that stores the firing history of each neuron circuit 110. When the depression operation is performed according to the schedule g(t), the magnitude of the voltage to be applied to each synaptic element 120 may be changed in accordance with the firing history of the neuron circuit 110 connected to the synaptic element 120 (in other words, as more firing events occur, a smaller voltage is applied to the synaptic element 120). This configuration can be implemented in, for example, the hardware configuration illustrated in FIG. 7 such that the postsynaptic voltage generators 230 apply a counter voltage that increases with the firing history (historical firing events) of the neuron circuit 110 to the bit lines 202, instead of grounding the bit lines 202, in the depression operation to lower the voltage to be applied to the synaptic elements 120 (the resistive random-access memories 210 in FIG. 7).

As described above, the spiking neural network device according to the second embodiment changes the probability or the rate at which the weight $w_{ji}$ of the synaptic elements 120 is depressed in a depression operation, depending on the firing history of each neuron circuit 110. In this regard, the more times the neuron circuit 110 fires, the less likely the weight $w_{ji}$ of the synaptic element 120 is depressed. This configuration can effectively prevent deletion of important information in the depression operation performed in accordance with the independent schedule g(t), and can train the spiking neural network more effectively.

According to at least one of the embodiments described above, a spiking neural network device that can learn information having a low spike density without increasing the device size or energy consumption necessary for the learning and its learning method can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spiking neural network device, comprising:
   a synaptic circuit having a variable weight;
   a neuron circuit to which a spike voltage having a magnitude adjusted in accordance with the weight of the synaptic circuit is input via the synaptic circuit, the neuron circuit being configured to fire when a predetermined condition is satisfied;
   a synaptic potentiation circuit configured to perform a potentiating operation for potentiating the weight of the synaptic circuit depending on input timing of the spike voltage and firing timing of the neuron circuit; and a synaptic depression circuit configured to perform a depression operation for depressing the weight of the synaptic circuit in accordance with a schedule independent from the input timing of the spike voltage and the firing timing of the neuron circuit.

2. The spiking neural network device according to claim 1, wherein the weight of the synaptic circuit takes discrete values.

3. The spiking neural network device according to claim 1, wherein the weight of the synaptic circuit is potentiated probabilistically upon occurrence of the potentiating operation.

4. The spiking neural network device according to claim 1, wherein the weight of the synaptic circuit is depressed probabilistically upon occurrence of the depression operation.

5. The spiking neural network device according to claim 1, wherein the weight of the synaptic circuit is depressed at a probability or a rate depending on a firing history of the neuron circuit.

6. The spiking neural network device according to claim 1, wherein the synaptic circuit includes a non-volatile memory, and the weight of the synaptic circuit corresponds to information stored in the non-volatile memory.

7. The spiking neural network device according to claim 1, wherein the schedule defines a operation timing of performing the depression operation, the operation timing is independent from the input timing of the spike voltage and the firing timing of the neuron circuit, and the synaptic depression circuit is configured to perform the depression operation when the operation timing comes.

8. The spiking neural network device according to claim 7, wherein the synaptic depression circuit probabilistically determines whether the weight of the synaptic circuit is depressed or not.

9. A learning method of a spiking neural network device including a synaptic circuit having a variable weight, and a neuron circuit to which a spike voltage having a magnitude adjusted in accordance with the weight of the synaptic circuit is input via the synaptic circuit, the neuron circuit being configured to fire when a predetermined condition is satisfied, the learning method comprising:

performing a potentiating operation for potentiating the weight of the synaptic circuit depending on input timing of the spike voltage and firing timing of the neuron circuit; and performing a depression operation for depressing the weight of the synaptic circuit in accordance with a schedule independent from the input timing of the spike voltage and the firing timing of the neuron circuit.

* * * * *